(12) United States Patent
Chan

(10) Patent No.: US 8,341,377 B2
(45) Date of Patent: *Dec. 25, 2012

(54) APPLICATION INDEPENDENT STORAGE ARRAY PERFORMANCE OPTIMIZER

(75) Inventor: Heng Po Chan, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,099

(22) Filed: Dec. 12, 2011

(65) Prior Publication Data

US 2012/0084509 A1     Apr. 5, 2012

Related U.S. Application Data

(63) Continuation of application No. 12/402,675, filed on Mar. 12, 2009, now Pat. No. 8,078,822.

(51) Int. Cl.
*G06F 12/00* (2006.01)

(52) U.S. Cl. .................................... 711/170

(58) Field of Classification Search .................. None
See application file for complete search history.

(56) References Cited

U.S. PATENT DOCUMENTS

| | | | |
|---|---|---|---|
| 5,574,851 A | 11/1996 | Rathunde | |
| 7,334,156 B2 | 2/2008 | Land et al. | |
| 8,078,822 B2 * | 12/2011 | Chan | 711/170 |
| 2008/0163234 A1 | 7/2008 | Stronge et al. | |

* cited by examiner

*Primary Examiner* — Hiep Nguyen
(74) *Attorney, Agent, or Firm* — Haynes and Boone, LLP

(57) ABSTRACT

A system comprising a performance module and an application. The performance module may be configured to (i) monitor a LUN for a predetermined amount of time, (ii) capture information relating to the LUN, and (iii) store the information. The application may be configured to (i) retrieve the information, (ii) analyze the information, (iii) generate a configuration based on the analysis of the information and (iv) send the configuration to the performance module. The performance module may reconfigure the LUN based on the configuration.

20 Claims, 4 Drawing Sheets

400

402
APPLICATION 108 PROCESSES THE DATA FILES

404
APPLICATION 108 PROVIDES LIST OF RECOMMENDED CONFIGURATIONS BASED ON IO PROFILE

406
USER FINE TUNES RECOMMENDED CONFIGURATIONS BASED ON PRIORITY

408
USER NARROWS DOWN TO ONE CONFIGURATION AND APPLICATION 108 PRESENTS THE NEW LUN CONFIGURATION

FIG. 4

APPLICATION INDEPENDENT STORAGE ARRAY PERFORMANCE OPTIMIZER

CROSS REFERENCE TO RELATED APPLICATION

This application is a Continuation of U.S. Ser. No. 12/402,675, filed Mar. 12, 2009, and entitled "Application Independent Storage Array Performance Optimizer." The entire disclosure of which is incorporated herein by reference in its entirety.

FIELD OF THE INVENTION

The present invention relates to storage arrays generally and, more particularly, to a method and/or apparatus for implementing an application independent storage array performance optimizer.

BACKGROUND OF THE INVENTION

Conventional approaches for determining if a LUN is properly configured for a particular environment are challenging. An application and the environment each have different input/output (IO) profiles. The LUN needs to be custom configured to achieve an optimal performance with different IO profiles. With conventional approaches, to determine if the LUN is configured correctly, an information technology (IT) administrator figures out how to provision a storage array. For example, an IT administrator (or a performance engineer) manually tunes the LUN. Currently available utilities make limited recommendations based on a very limited list of applications (i.e., SQL, Exchange) running on a server.

While creating the LUN, a user decides several parameters. These parameters include (i) LUN segment size, (ii) RAID level, (iii) the number of spindles/drives to use for the LUN, and/or (iv) LUN size. In conventional systems, in order to achieve optimal performance, these LUN parameters are determined by (i) IO size, (ii) sequential versus random IO, (iv) IO segment boundary, (v) performance (i.e., throughput, bandwidth, etc.), (vi) data availability (i.e., how fast data is needed), (vii) data reliability (i.e., how critical the data is), (viii) IO volume and/or (ix) IO ratio (i.e., % read versus % write).

The main disadvantages of conventional solutions are the cost and time involved in performance optimization. The IT administrator doing the fine tuning of the LUN needs to understand the IO profile of each application and/or how a RAID works. The IT administrator will also need to have the knowledge of the expected performance of the storage array network (SAN). Once the IT administrator determines what the appropriate settings should be, the LUNs need to be reconfigured and the performance measured. If the performance statistics do not match up with the expected performance numbers, the IT administrator will have to adjust the LUNs again. This process can take several iterations. Conventional solutions are lengthy and rely on an individual with the appropriate level of expertise. As a result, many installed storage arrays do not run at optimal performance levels.

It would be desirable to implement an application independent storage performance optimizer.

SUMMARY OF THE INVENTION

The present invention concerns a system comprising a performance module and an application. The performance module may be configured to (i) monitor a LUN for a predetermined amount of time, (ii) capture information relating to the LUN, and (iii) store the information. The application may be configured to (i) retrieve the information, (ii) analyze the information, (iii) generate a configuration based on the analysis of the information and (iv) send the configuration to the performance module. The performance module may reconfigure the LUN based on the configuration.

The objects, features and advantages of the present invention include providing an application independent storage array performance optimizer that may (i) be application independent, (ii) be generic and useable in a variety of environments, (iii) save money by eliminating the need to have an expert in Performance Tuning manually tune the storage array, (iv) be performed by any IT engineer, (v) reduce time by implementing software that may be finalized on the first attempt, (vi) provide a user confidence that the SAN has been configured for optimum performance, (vii) be non-disruptive by implementing a software tool that does not modify data and/or a LUN configuration during analysis, (viii) be run by any user against an installed SAN to ensure the SAN is configured for optimal performance, and/or (ix) allow end users to periodically reconfigure a SAN for optimal performance as certain parameters (e.g., IO profile) change.

BRIEF DESCRIPTION OF THE DRAWINGS

These and other objects, features and advantages of the present invention will be apparent from the following detailed description and the appended claims and drawings in which:

FIG. 4 is a flow diagram illustrating a third step of an embodiment of the present invention.

DETAILED DESCRIPTION OF THE PREFERRED EMBODIMENTS

Figure 1:
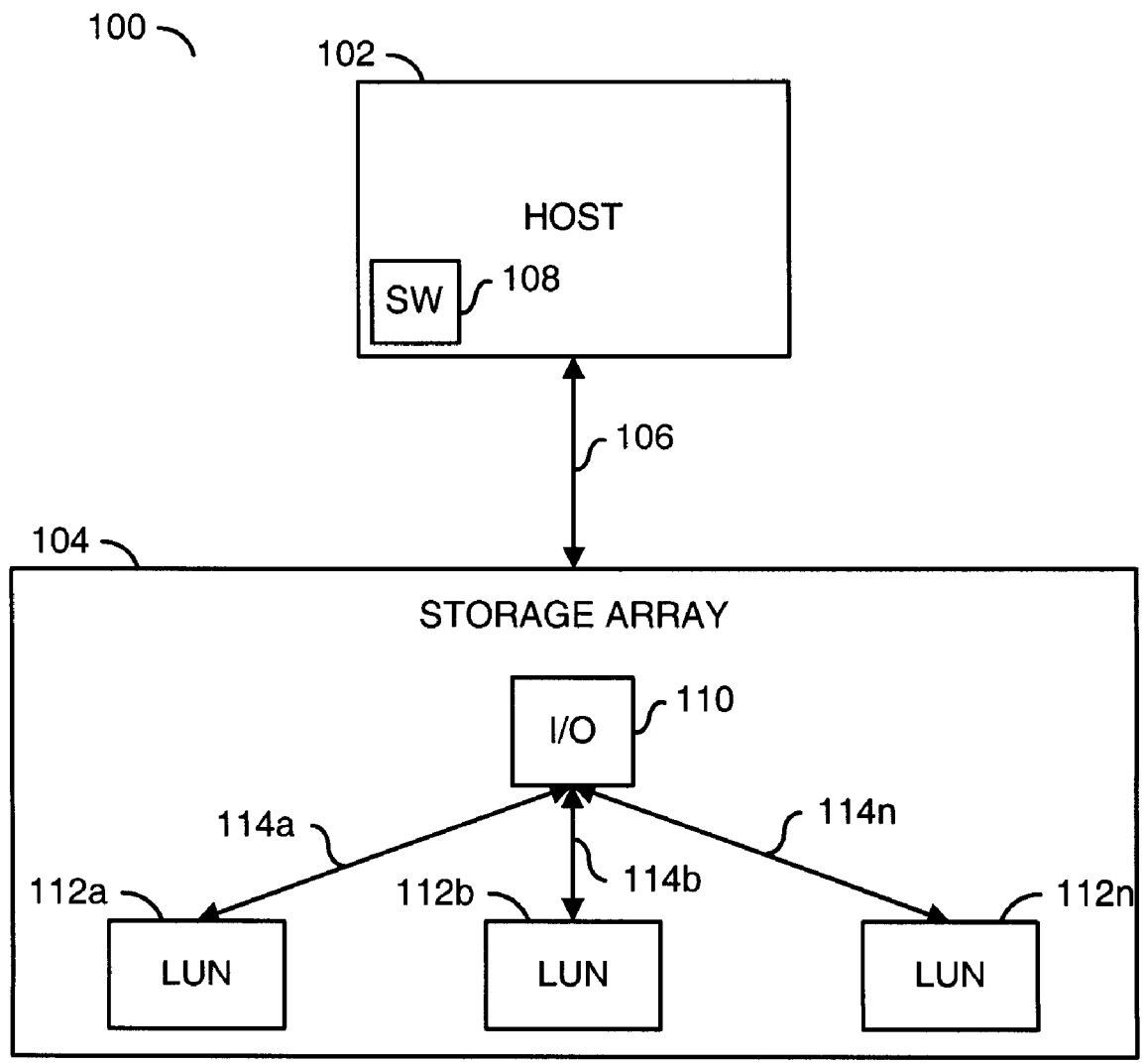
FIG. 1 is a block diagram of an embodiment of the present invention.

Referring to FIG. 1, a block diagram of a system 100 is shown in accordance with a preferred embodiment of the present invention. The system 100 generally comprises a module 102, a module 104, a connection 106, a module 108, a module 110, a set of modules 112a-112n, and a set of connections 114a-114n. The module 102 may be implemented as a host. The module 104 may be implemented as a storage array. For example, the module 104 may represent an array of disk drives or other storage devices (e.g., solid state storage, etc.). The host 102 may include the module 108. In one example, the module 108 may be implemented as an application (e.g., software). The storage array 104 may include the module 110 and the set of modules 112a-112n. The module 110 may be implemented as an input/output (IO) performance module.

The set of modules 112a-112n may be implemented as LUNs. The particular number of LUNs 112a-112n may be varied (e.g., increased and/or decreased) to meet the design criteria of a particular implementation (e.g., up to 2048 or more). IO requests are normally sent to the LUNs 112a-112n, which translate such requests to storage devices in the storage array 104. The connection 106 may be a network connection, such as a fiber channel connection or other type of network connection. The connections 114a-114n may be implemented as one or more logical connections within the storage array 104. The connection 106 and/or the connections 114a-

114n may each be implemented as one or more network segments. In one example, the system 100 may be application independent.

The system 100 may be implemented with the application 108 configured to run on the host 102. The IO performance module 110 may be configured to run on the storage array 104. The application 108 and the IO performance module 110 may implement a storage performance optimizer. The application 108 on the host 102 may have several capabilities. The application 108 may initiate the storage array 104 to start capturing data relating to an IO profile (or profiles) and a LUN profile (or profiles) for a predetermined amount of time (e.g., 24 hours, however other amounts of time may be implemented) on the LUNs 112a-112n. In one example, a user may select the predetermined amount of time via the application 108.

The application 108 may retrieve the IO profile data and LUN profile data from the storage array 104. The application 108 may process the IO profile data and LUN profile data. The application 108 may be configured to uncompress the IO profile data and/or LUN profile data on an as needed basis. The application 108 may make a recommendation on the characteristics of the LUNs 112a-112n based on the IO profile data and the LUN profile data. The recommendation may provide an optimum performance (e.g., configuration) based on a set of rules. In one example, the set of rules may be defined by a user. The application 108 may store and/or create new rules as needed.

The IO performance module 110 running on the storage array 104 may have several capabilities. The IO performance module 110 may create the IO profile data (e.g., as a file) and store the IO profile data (e.g., refer to TABLE 1 below). The IO performance module 110 may create the LUN profile data (or file) and store the LUN profile data (e.g., refer to TABLE 2 below). The IO performance module 110 may keep track of the LUNs 112a-112n for a predetermined amount of time (e.g., with a timer, such as a software timer module). In one example, the IO performance module 110 may compress (e.g., zip) the files (e.g., the IO profile data and the LUN profile data). Such compression may be optional and may be implemented on an as needed basis to reduce the size of the files.

The IO performance module 110 may store the files (e.g., in either compressed or uncompressed form). The IO performance module 110 may monitor a current performance including bandwidth (e.g., IO requests per second), throughput (e.g., MBs per second), and a number of IO requests received from the application 108. For example, the IO performance module 110 may monitor the number of IO requests and an amount of data sent to and from the host 102. The IO performance module 110 may keep track of the IO profile (e.g., read/write ratio, address range, IO request size, random vs. sequential addressing, performance, etc.).

A sample IO profile file may be shown in the following TABLE 1:

TABLE 1

| TIMESTAMP | LUN | OPCODE | LBA | TRANSFER LENGTH |
|---|---|---|---|---|
| 10/17/08 10:59 | 0x02 | 2A | 0x000191C4 | 0x14 |
| 10/17/08 10:59 | 0x02 | 2A | 0x0007B48C | 0x14 |
| 10/17/08 10:59 | 0x02 | 2A | 0x00015D80 | 0x14 |
| 10/17/08 10:59 | 0x02 | 2A | 0x000B5F38 | 0x14 |
| 10/17/08 10:59 | 0x02 | 2A | 0x000B0D1C | 0x14 |
| 10/17/08 10:59 | 0x02 | 2A | 0x0007A500 | 0x14 |
| 10/17/08 10:59 | 0x02 | 2A | 0x00087B10 | 0x14 |

TABLE 1-continued

| TIMESTAMP | LUN | OPCODE | LBA | TRANSFER LENGTH |
|---|---|---|---|---|
| 10/17/08 10:59 | 0x02 | 2A | 0x0011A6A4 | 0x14 |
| 10/17/08 10:59 | 0x02 | 2A | 0x00116270 | 0x14 |
| 10/17/08 10:59 | 0x02 | 2A | 0x0004D9D8 | 0x14 |
| 10/17/08 10:59 | 0x02 | 2A | 0x0007D8B8 | 0x14 |
| 10/17/08 10:59 | 0x02 | 2A | 0x000E15D4 | 0x14 |
| 10/17/08 10:59 | 0x02 | 2A | 0x000E86F4 | 0x14 |
| 10/17/08 10:59 | 0x02 | 2A | 0x0006D224 | 0x14 |
| 10/17/08 10:59 | 0x02 | 2A | 0x0008A644 | 0x14 |
| 10/17/08 10:59 | 0x02 | 2A | 0x000970C4 | 0x14 |
| 10/17/08 10:59 | 0x02 | 2A | 0x0007A988 | 0x14 |
| . | . | . | . | . |
| . | . | . | . | . |
| 10/18/08 10:58 | 0x02 | 2A | 0x0001D10C | 0x14 |
| 10/18/08 10:58 | 0x02 | 2A | 0x00030540 | 0x14 |
| 10/18/08 10:58 | 0x02 | 2A | 0x0000E468 | 0x14 |
| 10/18/08 10:58 | 0x02 | 2A | 0x000A6AC4 | 0x14 |
| 10/18/08 10:58 | 0x02 | 2A | 0x000D95F0 | 0x14 |
| 10/18/08 10:58 | 0x02 | 2A | 0x00033C7C | 0x14 |
| 10/18/08 10:58 | 0x02 | 2A | 0x00040030 | 0x14 |
| 10/18/08 10:58 | 0x02 | 2A | 0x000A050C | 0x14 |
| 10/18/08 10:58 | 0x02 | 2A | 0x0001AF60 | 0x14 |
| 10/18/08 10:58 | 0x02 | 2A | 0x000BFBF0 | 0x14 |
| 10/18/08 10:58 | 0x02 | 2A | 0x000A3694 | 0x14 |
| 10/18/08 10:58 | 0x02 | 2A | 0x0007DEA8 | 0x14 |
| 10/18/08 10:58 | 0x02 | 2A | 0x00070E4C | 0x14 |
| 10/18/08 10:58 | 0x02 | 2A | 0x000814F4 | 0x14 |
| 10/18/08 10:58 | 0x02 | 2A | 0x000FA7A0 | 0x14 |
| 10/18/08 10:58 | 0x02 | 2A | 0x0004AABC | 0x14 |
| 10/18/08 10:58 | 0x02 | 2A | 0x0001B1E0 | 0x14 |
| 10/18/08 10:58 | 0x02 | 2A | 0x000022E4 | 0x14 |
| 10/18/08 10:58 | 0x02 | 2A | 0x0000E468 | 0x14 |

The time the IO was processed may be represented by a column (e.g., TIMESTAMP). A particular one of the LUNs 112a-112n being monitored may be represented by a column (e.g., LUN). A SCSI opcode (e.g., where 2A=IO write and 28=IO read) may be represented by a column (e.g., OPCODE). The logical block address may be represented by a column (e.g., LBA). The LBA may correspond to an address where the write (or read) command is going to on the LUNs 112a-112n. The transfer length of each IO may be represented by a column (e.g., TRANSFER LENGTH) and may be one block (e.g., 512 bytes). The application 108 may analyze the IO profile in TABLE 1 and make a recommendation on how to configure the LUNs 112a-112n (e.g., segment size, number of drives per LUN, etc.). In one example, a command descriptor block (CDB) may determine if the IO request is a read command (e.g., 28) or a write command (e.g., 2A) The CDB may have a logical block address (LBA) and transfer length of the IO request.

A sample LUN profile file may be shown in the following TABLE 2:

TABLE-US-00002 TABLE 2 File ID: 10182008-1058 LUN Segment # of LUN RAID Level Size Drives/Spindles IO/s MB/s 0x02 5 0x10 5 3, 745 5.34

TABLE 2 may be implemented to keep track of the LUN profile. Each of the LUNs 112a-112n may have a corresponding LUN profile similar to the LUN profile in TABLE 2. The application 108 may make a recommendation for a configuration of the LUNs 112a-112n. The configuration may improve performance (e.g., bandwidth, throughput, etc.) based on the IO profile that was captured for each of the LUNs 112a-112n.

The system 100 may operate in a multi-step approach. In one step, the system 100 may store information (e.g., the IO profile data and the LUN profile data) on the storage array 104 on request (e.g., by the IO performance module 110). In another step, the system 100 may retrieve the information (e.g., by the application 108) on request. In another step, the system 100 may process the information collected (e.g., via the application 108) and may make a recommendation (e.g., of a LUN configuration) based on the set of rules. In one example, the set of rules may be defined by the user. The recommendation may be a set of values used to configure the storage array 104. For example, the set of values may be used to configure a particular one of the LUNs 112a-112n. The recommended configuration may include a segment size, number of drives, and/or a RAID level for the particular one of the LUNs 112a-112n.

Figure 2:
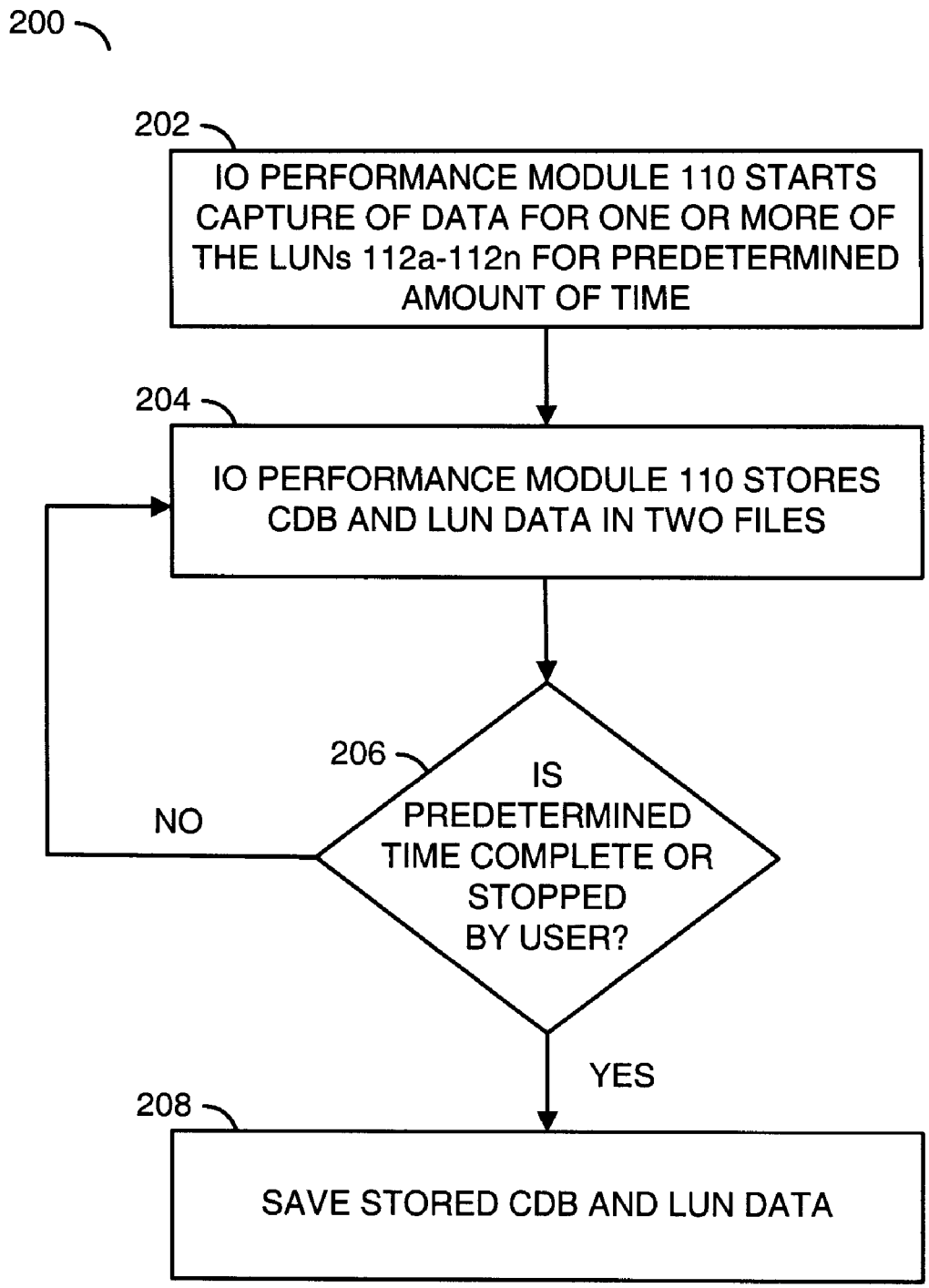
FIG. 2 is a flow diagram illustrating a first step of an embodiment of the present invention.

Referring to FIG. 2, a flow diagram of a process 200 is shown. The process (or method) 200 generally comprises a state 202, a state 204, a decision state 206, and a state 208. In the state 202, the IO performance module 110 may start to capture data (e.g., the IO profile and the LUN profile) for the LUNs 112a-112n for a predetermined amount of time. In the state 204, the IO performance module 110 may store a command descriptor block (CDB) and information about the LUNs 112a-112n in two files. The state 206 may determine if the predetermined amount of time has elapsed (or completed) or if data capture has been stopped by the user. If so, the process 200 may move to the state 208. In the state 208, the IO performance module 110 may save (and optionally compress, zip, etc.) the two files (e.g., CDB and information). If not, the process 200 may move back to the state 204.

The process 200 may illustrate the complete process on how the system 100 (e.g., the application 108) may initiate the IO performance module 110. The IO performance module 110 may be initiated on the storage array 104 (or controller) to start capturing and storing the IO command descriptor block (CDB) and LUN profile data (e.g., the information) relating to the LUNs 112a-112n. The process 200 may require a minimum configuration of the storage array 104 and the host 102. The IO performance module 110 may run on the storage array 104 and the application 108 may run on the host 102. In one example, the storage array 104 may be a commercial array (e.g., a 7900 by LSI Corporation, although other arrays may be implemented). Any host which has the application 108 installed and has access to the storage array 104 (e.g., implemented with the IO performance module 110) over the network connection 106 may be used.

A user may start the application 108 (or tool) on the host 102. The application 108 may allow the user to select one or more of the LUNs 112a-112n (e.g., 112a-112c) or create a new list of LUNs (e.g., 112d-112n) to optimize. The user may then select how long the application 108 will monitor the LUNs 112a-112n. Once the user has selected the amount of time to monitor the LUNs 112a-112n, a request may be sent down to the storage array 104 via the network connection 106. The IO performance module 110 may create a data file and start to capture the CDB of the LUNs 112a-112n being requested. A number representing each of the LUNs 112a-112n may also be stored with the CDB. The IO performance module 110 may start measuring a performance (e.g., bandwidth, throughput, etc.). When the duration to monitor the LUNs 112a-112n has expired, the IO performance module 110 may store the files. In one example, when the duration (e.g., predetermined time) to monitor the LUNs 112a-112n has expired, the IO performance module 110 may compress (e.g., zip, etc.) the files and then store the files in particular format (e.g., .zip, .rar, .mim, etc.). The files (either compressed or uncompressed) may then be ready for the application 108 to perform an analysis.

Figure 3:
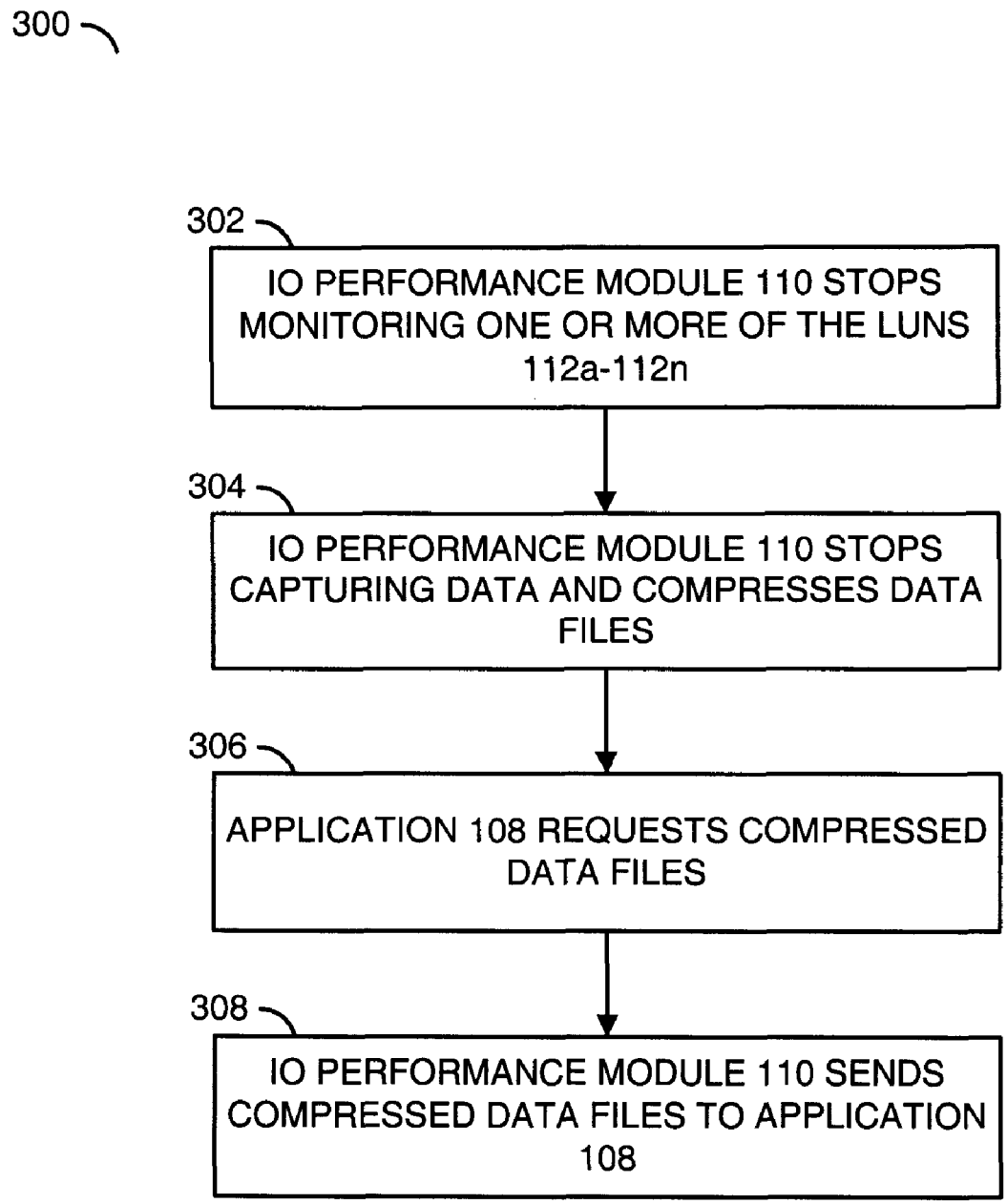
FIG. 3 is a flow diagram illustrating a second step of an embodiment of the present invention.

Referring to FIG. 3, a flow diagram of a process 300 is shown. The process (or method) 300 generally comprises a state 302, a state 304, a state 306, and a state 308. In the state 302, the IO performance module 110 may stop monitoring (e.g., by the user) or the predetermined time for monitoring may have elapsed. In the state 304, the IO performance module 110 may stop capturing information and compress (e.g., zip) the data. The compression in the state 304 may be implemented on an as needed basis. In the state 306, the application 108 may request the data file (or files) from the IO performance module 110. In the state 308, the IO performance module 110 may send the data file (or files) to the application 108.

After the completion of the first step, the required data (e.g., the IO profile data and the LUN profile data) may be stored in the storage array 104. In one example, the user may stop the IO performance module 110 from monitoring prior to the initial predetermined time. Once the IO performance module 110 may stop capturing the data, the IO performance module 110 may optionally compress (e.g., zip, archive, etc.) the data files. When the application 108 requests the data files from the IO performance module 110, the IO performance module 110 may transfer the data files to the host 102 via the network connection 106.

Referring to FIG. 4, a flow diagram of a process 400 is shown. The process (or method) 400 generally comprises a state 402, a state 404, a state 406, and a state 408. In the state 402, the application 108 may start processing the data files. In the state 404, the application 108 may provide a list of recommended configurations (e.g., LUN segment size, number of drives, RAID level, etc.) based on the IO profile. In the state 406, the user may fine tune the recommended configuration based on a priority (e.g., is the data critical?, is IO performance more important?, etc.). In the state 408, the user may narrow down to one configuration. In one example, the application 108 may present the new LUN configuration to the user.

After the completion of the second step, the data files may be processed by the application 108. The application 108 may analyze the IO profile and/or the LUN profile. The application 108 may calculate a (i) IO size (e.g., % large and % small), (ii) segment boundary (e.g., how often (%) does it cross the segment boundary based on small versus large IOs), (iii) IO mix (e.g., % read and % write), and/or (iv) IO randomness (e.g., versus sequential). The application 108 may make several recommendations (e.g., of a LUN configuration) to the user based on the set of rules. In one example, the set of rules may be stored by the application 108. The application 108 may then send the recommended configuration to the IO performance module 110. In one example, the IO performance module 110 may reconfigure a particular one of the LUNs 112a-112n based on the recommended configuration. In one example, the reconfiguration of the LUNs 112a-112n may be automatic. However, the reconfiguration of the LUNs 112a-112n may also be manual and/or based on a user confirmation.

Several different rules may be implemented based on the particular design implementation. For example, when there is a small number of random IO requests, a larger LUN segment size may be recommended to ensure that the segment size is large enough for the IO requests to stay within the segment boundary. For a large number of IO requests, a smaller LUN segment size may be recommended to ensure that the segment size is small so that the IO requests may be serviced by multiple drives within the LUN. In general, the more drives servicing the IO requests, the faster the response time.

Several different rules may be implemented based on the user data priority. The user may be given one or more options to select an appropriate RAID level. For example, the application 108 may recommend a RAID 1 LUN if the data reliability is more critical than performance. A RAID 5 LUN may be recommended instead if IO performance is more important than the data reliability. A RAID 6 LUN may be recommended if both are important. The decision may be determined by the set of rules stored by the application 108.

The functions performed by the diagrams of FIGS. 2-4 may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

What is claimed is:

1. A system for configuring a storage array, the system comprising:
    a host computer device in communication with the storage array, the host computer device including an application configured to:
        initiate a module on the storage array to monitor a LUN for a predetermined amount of time and to store information from the monitoring;
        retrieve said information;
        analyze said information;
        generate a configuration based on said analysis of said information; and
        send said configuration to said module on the storage array to reconfigures reconfigure said LUN based on said configuration.

2. The system according to claim 1, wherein said configuration is presented to a user for confirmation before being sent to said module on the storage array.

3. The system according to claim 2, wherein said configuration is tuned by said user.

4. The system according to claim 3, wherein said user tunes said configuration based on a criticality of said information and an importance of IO performance.

5. The system according to claim 1, wherein said module on the storage array automatically reconfigures said LUN based on said configuration.

6. The system according to claim 1, further comprising a network configured to connect said module on the storage array and said application.

7. The system according to claim 1, wherein (i) said module on the storage array is further configured to monitor a plurality of LUNs and (ii) said application is further configured to generate a configuration for each of said plurality of LUNs.

8. The system according to claim 1, wherein said configuration includes a recommendation for (i) a segment size, (ii) number of drives, and (iii) a RAID level, of said LUN.

9. The system according to claim 1, wherein said information comprises an IO profile.

10. The system according to claim 9, wherein said IO profile comprises a timestamp, a LUN address, an opcode, a logical block address, and a transfer length.

11. The system according to claim 9, wherein said information further comprises a LUN profile.

12. The system according to claim 1, wherein said module on the storage array is further configured to compress said information prior to storing said information.

13. A computer program product having a computer readable medium tangibly recording computer program logic for configuring a storage array, the computer program product comprising:
    code to initiate a module on the storage array to monitor a LUN on the storage array and to store information from the monitoring;
    code to retrieve the information from the module;
    code to analyze the information for input/output characteristics of the LUN;

code to generate a configuration based on the input/output characteristics of the LUN; and code to send the configuration to the module on the storage array to reconfigure the LUN based on the configuration.

14. The computer program product according to claim 13, wherein said configuration is presented to a user for confirmation before being sent to said module on the storage array.

15. The computer program product according to claim 14, wherein said configuration is tuned by said user.

16. The computer program product according to claim 15, wherein said user tunes said configuration based on a criticality of said information and an importance of IO performance.

17. The computer program product according to claim 13, wherein said module on the storage array automatically reconfigures said LUN based on said configuration.

18. The computer program product according to claim 13, wherein said information comprises an IO profile.

19. The computer program product according to claim 18, wherein said IO profile comprises a timestamp, a LUN address, an opcode, a logical block address, and a transfer length.

20. A computer-implemented method for configuring a storage array, the computer-implemented method comprising:

initiating a module on the storage array to monitor a LUN on the storage array and to store information from the monitoring;

retrieving the information from the module;

analyzing the information for input/output characteristics of the LUN;

generating a configuration based on the input/output characteristics of the LUN; and sending the configuration to the module on the storage array to reconfigure the LUN based on the configuration.

* * * * *